ized Patent [19]

United States Patent [19]
Savides et al.

[11] 3,783,146
[45] Jan. 1, 1974

[54] AMMONIUM POLYPHOSPHATE-PHOSPHONIUM BROMIDE-ALKOXYALKANOLAMINE AS FLAME-RETARDANTS FOR POLYOLEFINS

[75] Inventors: Christos Savides; Joseph Fredrick Cannelongo, both of Piscataway, N.J.

[73] Assignee: American Cyanamid Company, Stamford, Conn.

[22] Filed: Apr. 3, 1972

[21] Appl. No.: 240,815

[52] U.S. Cl........... 260/45.9 R, 252/8.1, 260/41 A, 260/41 B, 260/94.9 GB, 260/DIG. 19
[51] Int. Cl................................................ C09k 3/28
[58] Field of Search............... 260/45.9 W, 94.9 GB, 260/945, DIG. 16; 252/8.1

[56] References Cited
UNITED STATES PATENTS

| | | | |
|---|---|---|---|
| 3,649,591 | 3/1972 | Murray et al. | 260/41 |
| 3,419,518 | 12/1968 | Mahling et al. | 260/41 |
| 3,542,748 | 11/1970 | Arthen | 260/80.7 |
| 3,346,547 | 10/1967 | Cohen | 260/94.9 |
| 2,891,027 | 6/1959 | Coler et al. | 260/32.6 |
| 3,364,192 | 1/1968 | Leach | 260/94.9 |
| 3,206,496 | 9/1965 | Rauhut | 260/464 |
| 3,309,425 | 3/1967 | Gillham et al. | 260/893 |
| 3,359,234 | 12/1967 | Milionis et al. | 260/45.75 |

Primary Examiner—Donald E. Czaja
Assistant Examiner—R. A. White
Attorney—Frank M. Van Riet

[57] ABSTRACT

Flame-retardant compositions which do not "plate-out" on metal surfaces comprising (A) monophosphonium halides, diphosphonium halides or various diphosphoniacyclohexane dibromides and diiodides, (B) ammonium polyphosphate, and (C) an alkoxyalkanolamine and polyolefins containing said compositions, are disclosed.

12 Claims, No Drawings

AMMONIUM POLYPHOSPHATE-PHOSPHONIUM BROMIDE-ALKOXYALKANOLAMINE AS FLAME-RETARDANTS FOR POLYOLEFINS

BACKGROUND OF THE INVENTION

The production of resin compositions which are flame-retardant is of considerable commercial importance in that such articles as castings, moldings, extrusions etc. are required, or at least desired, to be resistant to fire and flame and to possess the ability to endure heat without deterioration. Typical illustrations of applications of such compositions include castings and extrusions for live electrical contacts which should not be ignited by flame or sparks, structural items such as pipes, wall coverings etc. and the like.

The use of certain additives for the purpose of reducing the flammability of various thermoplastic polymers, especially polyolefins, is well known to those skilled in the art. Among the additives currently employed for such use are various phosphonium bromides which are employed in conjunction with ammonium polyphosphate, see, for example U.S. Pat. No. 3,649,591. Additionally, such materials as various diphosphoniacyclohexane dihalides have also been found effective for such purposes, see U.S. copending application, Ser. No. 39,156, filed May 20, 1970, said patent and said application hereby being incorporated herein by reference.

Although both of these classes of phosphonium halides function effectively alone in polymeric materials as flame-retardants, it has been found that their effectiveness can be increased by employing them in conjunction with ammonium polyphosphate. Due to the synergistic effect of the ingredients, effective flame-retardance can be imparted to thermoplastic polymers, especially polyolefins, at lesser overall concentrations of additive than previously necessary. Furthermore, the incorporation of various metal salts, i.e., carbonates, oxides, etc. has previously been found to render the thermoplastic polymers "non-dripping" when utilized in conjunction with the phosphonium halide-ammonium polyphosphate combination.

Even though the above-discussed two-component and three-component flame-retardant compositions have employed wide spread commercial acceptance in the industry, the compositions have been found to possess one drawback. That is to say, a serious problem associated with the use of the above-described flame-retardant compositions is a phenomena called "plate-out." When a polymer containing the 2 and 3 component compositions is extruded, some of the composition or a component or components of the composition "plate-out" on the inside surface of the extruder barrel. The "plated-out" material gradually builds up and causes contamination problems in subsequent extrusions, costly maintenance of the extrusion equipment and, more seriously, a reduction in the flame-retardant properties of the extruded article of manufacture. Thus, the industry has been faced with an important problem, the solution to which has been presented by the instant invention.

SUMMARY

We have now found that the above-discussed "plate-out" problem which accompanies the usage of phosphonium halide-ammonium polyphosphate in the flame-retardance of polyolefins can be overcome by treating the flame-retardant additive or combining with the flame-retardant additive, during its incorporation into a polyolefin, a small but effective amount of an alkoxyalkanolamine.

Furthermore, not only does the alkoxyalkanolamine prevent "plate-out" of the flame-retardant, but it improves the dispersibility thereof in the polyolefins, thereby reducing the previous complex admixing techniques sometimes necessary in incorporating the flame-retardant composition into the polyolefin.

DESCRIPTION OF THE INVENTION INCLUDING PREFERRED EMBODIMENTS

The novel flame-retardant compositions of the present invention comprise a combination or mixture of (A) (1) a phos-phonium bromide having the formula

$$R_3P^+R' \cdot Br^-$$

wherein R is phenyl or 2-cyanoethyl and R' is lower alkyl, 2-cyanoethyl, benzyl or bromobenzyl, (2) a diphosphonium bromide having the formula

$$R_3P^+-CH_2CH_2-P^+R_3 \cdot 2Br^-$$

wherein R is as defined above, or alkyl, (3) 1,1,4,4-tetrakis-(2-cyanoethyl)-1,4-diphosphoniacyclohexane dibromide (hereinafter sometimes referred to as TDPB) or (4) 1,1,4,4-tetrakis(2-cyanoethyl)-1,4-disphosphoniacyclohexane diiodide (hereinafter sometimes referred to as TDPI), (B) ammonium polyphosphate and (C) an alkoxyalkanolamine having the formula

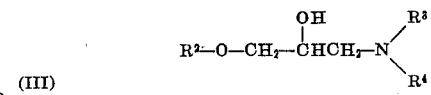

(III)

wherein $R^2$ is an alkyl radical of eight to 18 carbon atoms, inclusive, $R^3$ is $CH_2-CHR^5(OCH_2CHR^5)_nOH$ wherein n is an integer of 0–9, inclusive, $R^4$ is hydrogen, lower alkyl or $R^3$ and each $R^5$ is, individually, hydrogen or lower alkyl.

The first critical component of our novel compositions, as mentioned above, is a compound represented by Formula I, above, Formula II, above, TDPB or TDPI. The compounds of Formulae I and II are well known in the art, as are methods for their preparation, as evidenced by U.S. Pat. Nos. 3,530,164, 3,322,861 and 3,005,013 while TDPB and TDPI are likewise well known as evidenced by U.S. Pat. No. 3,206,496, the above four patents hereby being incorporated herein by reference.

The second critical component of our novel flame-retardant compositions is an ammonium polyphosphate. These compounds are also well known in the art, see U.S. Pat. No. 3,423,343 3,513,114, said patents also being incorporated herein by reference. These ammonium polyphosphates are generally substantially water-insoluble and possess a plurality of P-O-p type linkages. They can be represented by the formula

$$H_{(r-m)+2}(NH_4)_m P_r O_{3r+1}$$

wherein z is an integer having an average value greater than 10, m/z is between about 0.7 and about 1.1 and the maximum value of m is equal to z+2. They are straight or branched chain structures having nearly all the nitrogen present therein as ammonical nitrogen. The average numerical value of z, using end group titration after acid formation, is from about 20–400, while using the light scattering method, the average weight value of z is above about 500, preferably 500–100,000 and especially 1,000–3,000. The ammonium polyphosphates exhibit different crystalline forms but are also found in the non-crystalline or amorphous form also.

The combination of component (A) and component (B) is used in a ratio of (A):(B) ranging from about 2:1 to about 1:2, respectively.

The third critical component of our novel compositions is an alkoxyalkanolamine represented by Formula III, above. As with the other components of our invention, these alkoxyalkanolamines are well known in the art as represented by U.S. Pat. No. 3,542,748, hereby incorporated herein by reference. The alkoxyalkanolamines are generally recognized as anti-static agents for polymers and include such useful compounds as N-(2-hydroxy-3-dodecyloxypropyl) ethanolamine; N-(2-hydroxy-3-dodecyloxypropyl) diethanolamine; N-(2-hydroxy-3-dodecyloxy-propyl)-2-(2'-hydroxyethoxy)ethylamine; N-(2-hydroxy-3-octyl-oxypropyl)ethanolamine; N-(2-hydroxy-3-octyloxypropyl)-2-(2'-hydroxyethoxy)ethamine and the like.

The combination of components (A), (B) and (C) is useful as a flame-retardant which does not "plate-out" onto metal surfaces when incorporated into polyolefins in a flame-retarding amount, i.e., at least about 5 percent, by weight, preferably from about 5 percent to about 25 percent, by weight, based on the weight of the polyolefin. The ratio of (A):(B) is as mentioned above. The amount of component (C) employed should range from about 0.1 percent to about 0.75 percent, by weight, based on the weight of the polyolefin.

The polyolefins which are rendered flame-retardant by the incorporation therein of our novel "non-plating-out" flame-retardant compositions should possess from two to four carbon atoms, inclusive, and include the homopolymers of ethylene, propylene, butylene, isobutylene etc. and copolymers of these olefins with one another, e.g., copolymers of ethylene and propylene containing 10–90 percent of ethylene, by weight.

As is also disclosed in above-mentioned U.S. Pat. No. 3,649,591 various oxides and/or carbonates may also be present in the flame-retardant compositions so as to render the flame-retarded polyolefins "non-dripping", i.e. the polymer does not drip, either as a burning or molten mass, when ignited. The oxides or carbonates are added to the polyolefin in amounts ranging from about 0.25 percent to about 5.0 percent, by weight, based on the weight of the polyolefin. Typical carbonates and oxides include alkali metal carbonates such as sodium carbonate, potassium carbonate, etc.; alkaline earth metal oxides, such as barium oxides, magnesium oxide, etc.; alkaline earth metal carbonates such as magnesium carbonate, calcium carbonate etc.; Group IV B metal oxides such as silica dioxide, stannic oxide etc.; titanium dioxide; zinc oxide; aluminum oxide; antimony oxide and the like.

The novel compositions of the instant invention may be incorporated into the polyolefins, as such, or as individual components, by any known method. For example, the components (A), (B) and (C) may be added individually, or in any combination, to the polyolefin by (1) milling the polyolefin and the components on a two-roll mill, in a Banbury mixer, etc., by (2) molding or extruding the components and the polyolefin simultaneously or by (3) merely blending all the materials together in powder or liquid (solution) form and thereafter forming the desired product. Additionally, the components or combination of components may be added during the production of the polyolefin, provided, however, that the catalyst, etc., other conditions and other ingredients of the polymerization system are inert thereto.

It is also within the scope of the instant invention to incorporate such ingredients as plasticizers, dyes, pigments, heat and light stabilizers, antioxidants, etc., into the flame-retarded polymer compositions claimed herein.

The following examples are set forth for purposes of illustration only and are not to be construed as limitations on the present invention except as set forth in the appended claims. All parts and percentages are by weight unless otherwise specified.

The ammonium polyphosphate employed has a phosphorus weight percent of 30.2; an ammonical nitrogen to phosphorus molar ratio of 0.92; and exhibits crystalline form d,A–6.06; 5.47; 3.83; 3.50; 3.24.

In all instances, the samples containing the ethanolamine derivative passed the ASTM–D–635 flammability test. Those samples containing titanium dioxide or silica dioxide passed flammability test UL–94 as "non-dripping." The samples which "plated-out" showed a decrease in flame-retardancy over those where no "plate-out" occurred.

EXAMPLE I

To a suitable mixing vessel are added 10 parts of ethylenebis[tris(2-cyanoethyl)]phosphonium bromide and 10 parts of ammonium polyphosphate. The ingredients are thoroughly admixed and the resultant mixture is then dry blended with 80 parts of unstabilized polypropylene and the resultant composition is milled on a standard plastic mill.

A portion of the milled composition is then designated as Sample A and compressed into a thin film between two aluminum foil sheets. The sheets are then separated. "Plate-out" is observed on the aluminum sheets as a white deposit conforming to the shape of the polypropylene film.

A second and third portion of the previously milled, but uncompressed, composition are then blended further with 0.25 percent, by weight, based on polypropylene (Sample B) and 0.50 percent, by weight, based on polypropylene (Sample C), respectively, of N-(2-hydroxy-3-dodecyloxypropyl)ethanolamine. These two resulting compositions are then compressed as with Sample A, above. The results are set forth in Table I, below.

Table I

| Specimen | Plate-Out Observed |
| --- | --- |
| Sample A | Very Severe |
| Sample B | Trace to Slight |
| Sample C | Very Slight to none |

Additionally, visual examination of the films of Samples A, B and C indicate a much better dispersion of the dibromide-polyphosphate flame-retardant in Samples B and C than in Sample A.

EXAMPLE 2

The procedure of Example 1 is again followed except that 1.0 part of titanium dioxide is added with the dibromide-polyphosphate flame-retardant. Similar results are achieved.

EXAMPLE 3

The procedure of Example 1 is again followed except that 1,1,4,4-tetrakis(2-cyanoethyl)-1,4-diphosphoniacyclohexane dibromide is substituted for the phosphonium bromide therein. Again only trace amounts of "plate-out" are observed in the samples containing the ethanolamine derivative while the sample free of ethanolamine derivative exhibits extreme "plate-out."

EXAMPLE 4

When the procedure of Example 3 is followed utilizing the cyclohexane diiodide instead of the dibromide, similar results are observed.

EXAMPLES 5-8

Replacement of the ethanolamine derivative of Example 1, all other limitations and conditions remaining equal, by an equivalent amount of (5) N-(2-hydroxy-3-dodecyloxypropyl)-2-(2'-hydroxyethoxy)ethylamine; (6) N-(2-hydroxy-3-octyloxypropyl)-2-(2'-hydroxyethoxy)ethylamine; (7) N-(2-hydroxy-3-octyloxypropyl)ethanolamine and (8) N-(2-hydroxy-3-dodecyloxypropyl)di-ethanolamine results in a similar prevention of "plate-out" of the ultimate compositions.

EXAMPLE 9

The procedure of Example 2 is again followed except that the titanium dioxide is replaced by an equivalent amount of silica dioxide. Again "plate-out" is materially decreased in the samples containing the ethanolamine derivative while the sample free of ethanolamine derivative "plates-out" badly.

EXAMPLES 10-12

The polypropylene of Example 1 is replaced by (10) polyethylene; (11) polyisobutylene and (12) an ethylene- propylene copolymer (20/80), respectively, all else remaining equal. Again, the presence of the ethanolamine derivative substantially prevents "plate-out" while the sample free of ethanolamine derivative exhibits excessive "plate-out."

1. A composition comprising (A) ethylenebis[tris(2-cyanoethyl)]phosphonium bromide or 1,1,4,4-tetrakis(2-cyano-ethyl)-1,4-diphosphoniacyclohexane dibromide or diiodide, (B) ammonium polyphosphate, the ratio of (A):(B) ranging from about 2:1 to about 1:2, respectively, and (C) from about 0.1 percent to about 0.75 percent, by weight, based on the weight of the polymer to which the composition is to be added, of a compound having the formula

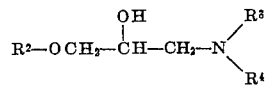

wherein $R^2$ is an alkyl radical of eight to 18 carbon atoms, inclusive, $R^3$ is $CH_2-CHR^5(OCH_2CHR^5)_nOH$ wherein n is an integer of 0–9, inclusive, $R^4$ is hydrogen, lower alkyl or $R^3$ and each $R^5$ is, individually, hydrogen or lower alkyl.

2. A composition according to claim 1 wherein (A) is ethylenebis[tris(2-cyanoethyl)]phosphonium bromide.

3. A composition according to claim 1 wherein (A) is 1,1,4,4-tetrakis(2-cyanoethyl)-1,4-diphosphoniacyclohexane dibromide.

4. A composition according to claim 1 wherein (A) is 1,1,4,4-tetrakis(2-cyanoethyl)-1,4-diphosphoniacyclohexane diiodide.

5. A composition according to claim 1 wherein (C) is N-(2-hydroxy-3-dodecyloxypropyl)ethanolamine.

6. A composition according to Claim 1 containing, in addition thereto, (D) from about 0.25 to about 5.0 percent, by weight, based on the weight of the polymer to which the composition is to be added, of titanium dioxide or silica dioxide.

7. A composition comprising a polyolefin having incorporated therein a flame-retarding amount of the composition of claim 1.

8. A composition according to claim 7 wherein said polyolefin is polypropylene.

9. A composition according to claim 7 wherein said (A) is ethylenebis[tris(2-cyanoethyl)]phosphonium bromide.

10. A composition according to claim 7 wherein said (C) is N-(2-hydroxy-3-dodecyloxypropyl)ethanolamine.

11. A composition according to claim 1 wherein said (A) is ethylenebis[tris(2-cyanoethyl)]phosphonium bromide and (C) is N-(2-hydroxy-3-dodecyloxypropyl)ethanolamine.

12. A composition according to claim 7 wherein said polyolefin is polypropylene, (A) is ethylenebis[tris(2-cyano-ethyl)]phosphonium bromide and (C) is N-(2-hydroxy-3-dodecyloxy-propyl)ethanolamine.

* * * * *